US012726596B2

(12) United States Patent
Vang

(10) Patent No.: US 12,726,596 B2
(45) Date of Patent: Sep. 1, 2026

(54) WEARABLE SMARTVIEW IMAGING APPARATUS WITH CAMERA AND LCD FUNCTIONS

(71) Applicant: Kong Vang, Concord, NC (US)

(72) Inventor: Kong Vang, Concord, NC (US)

( * ) Notice: Subject to any disclaimer, the term of this patent is extended or adjusted under 35 U.S.C. 154(b) by 0 days.

(21) Appl. No.: 18/404,786

(22) Filed: Jan. 4, 2024

(65) Prior Publication Data

US 2024/0422294 A1 Dec. 19, 2024

Related U.S. Application Data

(60) Provisional application No. 63/508,816, filed on Jun. 16, 2023.

(51) Int. Cl.
*H04N 7/18* (2006.01)
*G06F 3/01* (2006.01)
*H04N 23/62* (2023.01)

(52) U.S. Cl.
CPC ............. *H04N 7/183* (2013.01); *H04N 23/62* (2023.01); *G06F 3/012* (2013.01); *G06F 3/017* (2013.01)

(58) Field of Classification Search
None
See application file for complete search history.

(56) References Cited

U.S. PATENT DOCUMENTS 9,678,343 B2 * 6/2017 Kuehne .................. G06F 3/011
2015/0348327 A1 * 12/2015 Zalewski ................. G06F 3/01 345/419
2023/0038695 A1 * 2/2023 Yee ......................... G06F 3/015
2023/0146677 A1 * 5/2023 Woo ........................ G06F 3/017 345/156
2023/0163449 A1 * 5/2023 Choi ........................ H01Q 1/48 343/718
2024/0045943 A1 * 2/2024 Lee ......................... G06T 19/20
2024/0295741 A1 * 9/2024 Su ......................... G02B 27/017
2024/0380875 A1 * 11/2024 Ryu ....................... H04N 23/90

* cited by examiner

*Primary Examiner* — Talha M Nawaz

(57) ABSTRACT

A wearable smartview apparatus and system are described which enables a medical or dental professional to enhance their practice. More particularly, the system offers enhanced imaging capabilities whereby images captured by a camera associated with a wearable smartview apparatus can be displayed to multiple devices in real-time if desired. The smartview apparatus includes a frame supporting the camera, a viewing module, and a microphone coupled to the frame or separate therefrom which can be used to control the operations of the camera.

13 Claims, 4 Drawing Sheets

WEARABLE SMARTVIEW IMAGING APPARATUS WITH CAMERA AND LCD FUNCTIONS

CROSS-REFERENCE TO RELATED APPLICATIONS

This application claims the benefit of U.S. Provisional Application No. 63/508,816, filed on Jun. 16, 2023. The entire disclosure of the above application is incorporated herein by reference.

FIELD

The present disclosure relates to a wearable smartview apparatus (WSA) employing an adjustable digital camera and LCD display for healthcare applications and a system for employing the apparatus.

BACKGROUND

This section provides background information related to the present disclosure which is not necessarily prior art.

The present invention relates to an apparatus and system employing a wearable smartview apparatus to carry out healthcare analysis or other procedures. More specifically, it encompasses the integration of unique smartview technologies into medical and/or dental healthcare to enhance functionalities and improved imagery during various system operations.

SUMMARY

This section provides a general summary of the disclosure, and is not a comprehensive disclosure of its full scope or all of its features.

The present invention seeks to optimize healthcare by integrating unique smartview technologies into analysis and procedures in the medical and dental fields for example. The system comprises a wearable smartview device such as a pair of smart glasses or other headsets equipped with an adjustable high resolution digital camera, a high-resolution display, and a microphone through which voice commands can be used to control the various displays. The glasses can be connected to a central workstation that stores patient records, treatment plans, and diagnostic software, for example.

The integrated camera allows the medical or dental professional to capture real-time images of interest, which may then overlaid with relevant patient information, giving a comprehensive and real-time display of the patient's health. This stream of information can include radiographs, diagnostic results, treatment notes, and other pertinent data.

The smartview apparatus also includes an LCD display which can be used to display images captured by the high resolution camera in real-time and/or images captured by an associated device such as hand-held cameras and/or dental cameras which may be associated with the central workstation.

Furthermore, the smartview apparatus may incorporate augmented reality elements, enabling healthcare professionals to identify potential issues, relevant anatomical landmarks, and precise areas of operation. These virtual overlays can guide the medical or dental professional during various procedures, such as exploratory or reparative surgical procedures or root canals, dental restorations, and prosthetic fittings, by way of non-limiting example.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates a wearable smartview apparatus of the present invention;

FIG. 1A demonstrates a view on the LCD screen of the wearable smartview apparatus;

Corresponding reference numerals indicate corresponding parts throughout the several views of the drawings.

DETAILED DESCRIPTION

Figure 1:
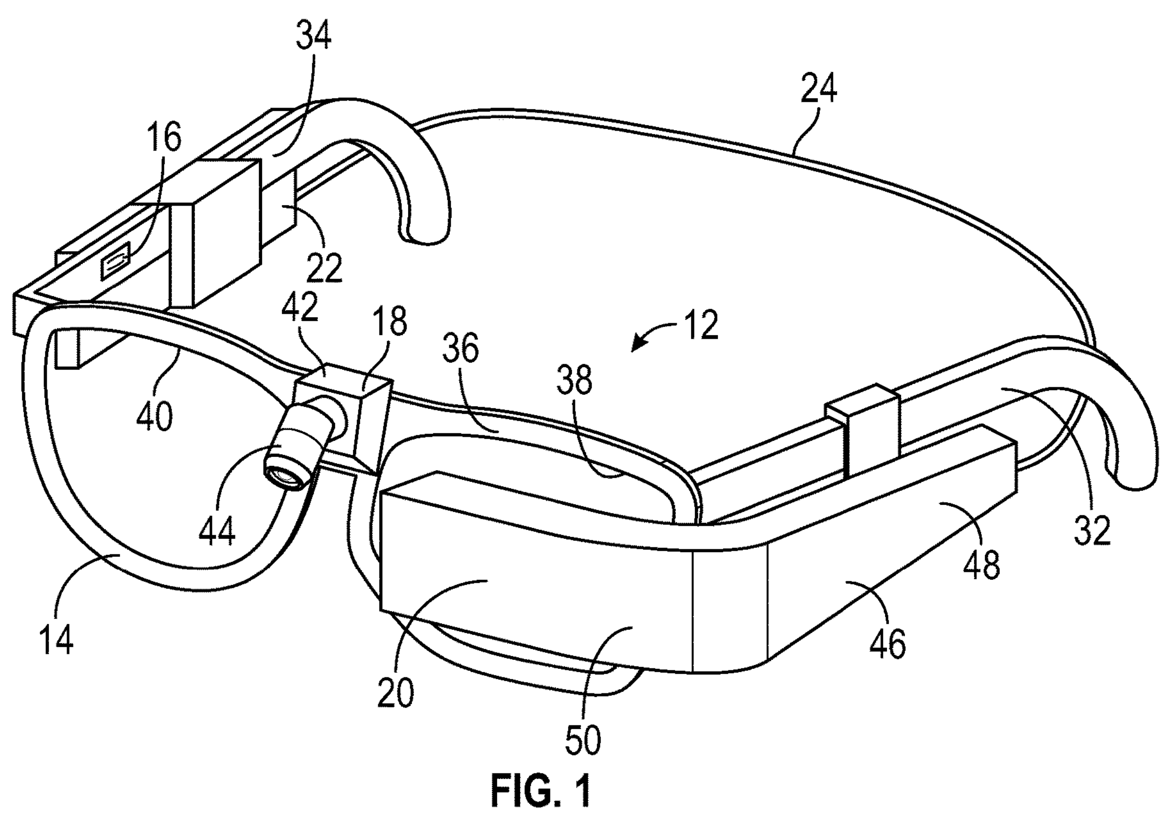
Figure 1A:
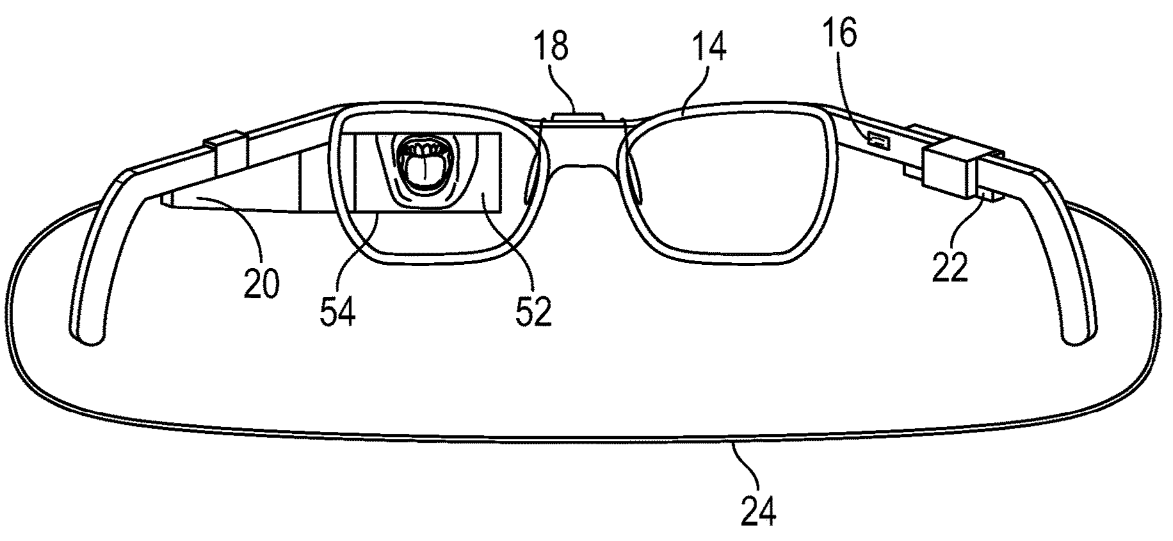
Figure 2:
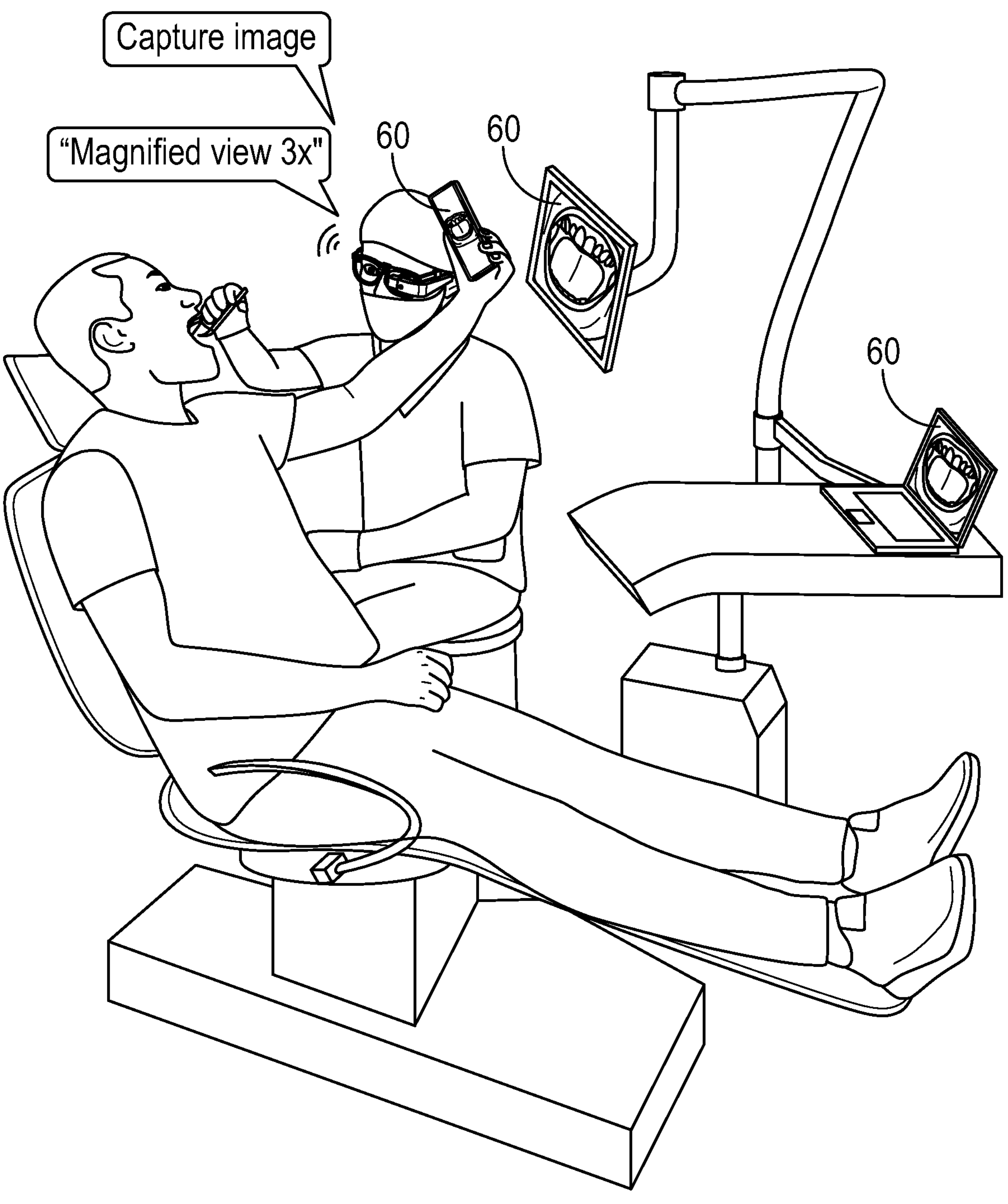
FIG. 2 is a schematic representation of the wearable smartview apparatus in accordance with the present invention being used in an office setting.
Figure 3:
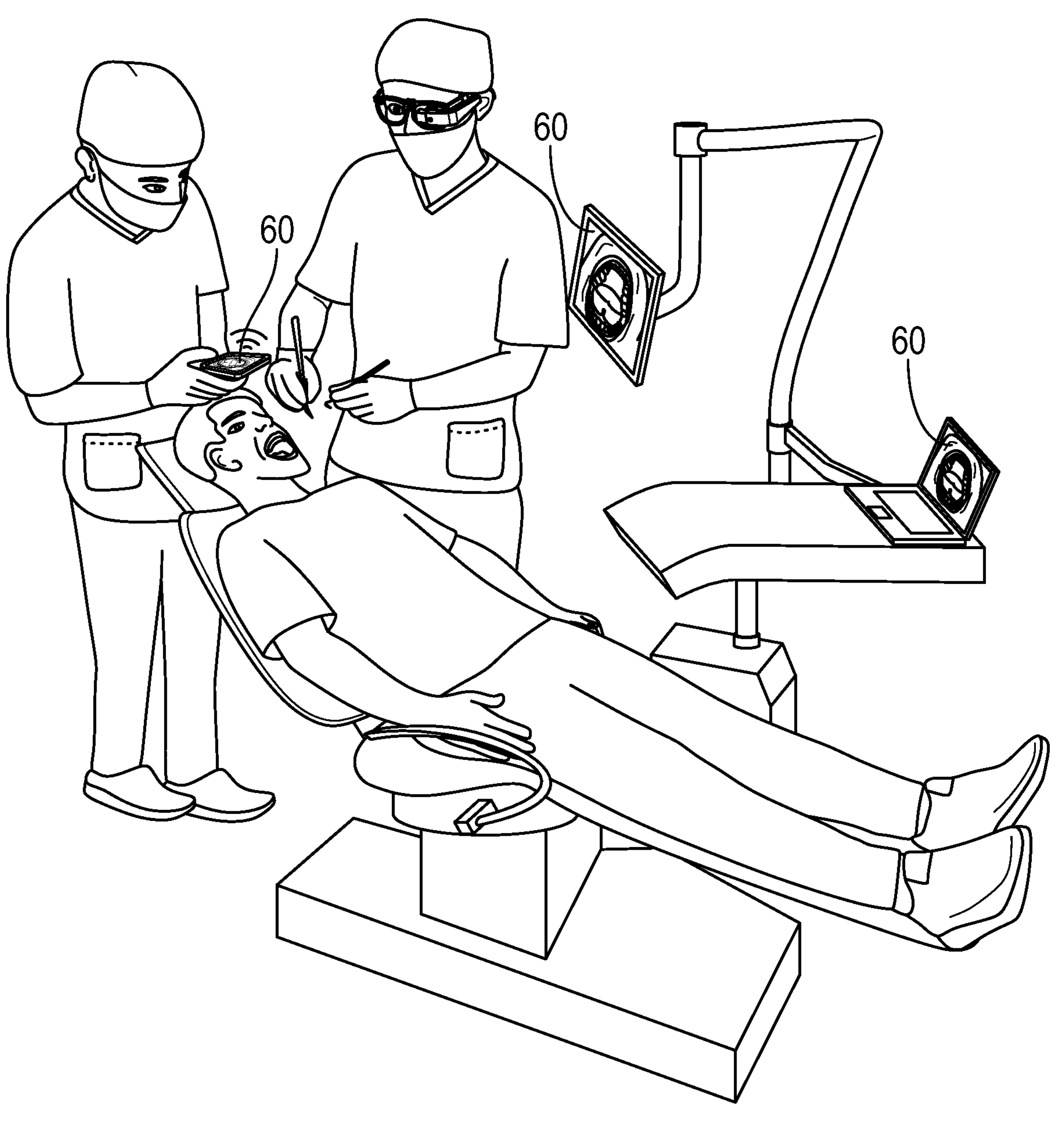
FIG. 3 shows an image captured by an alternative camera being displayed on the multiple display apparatuses.
Figure 4:
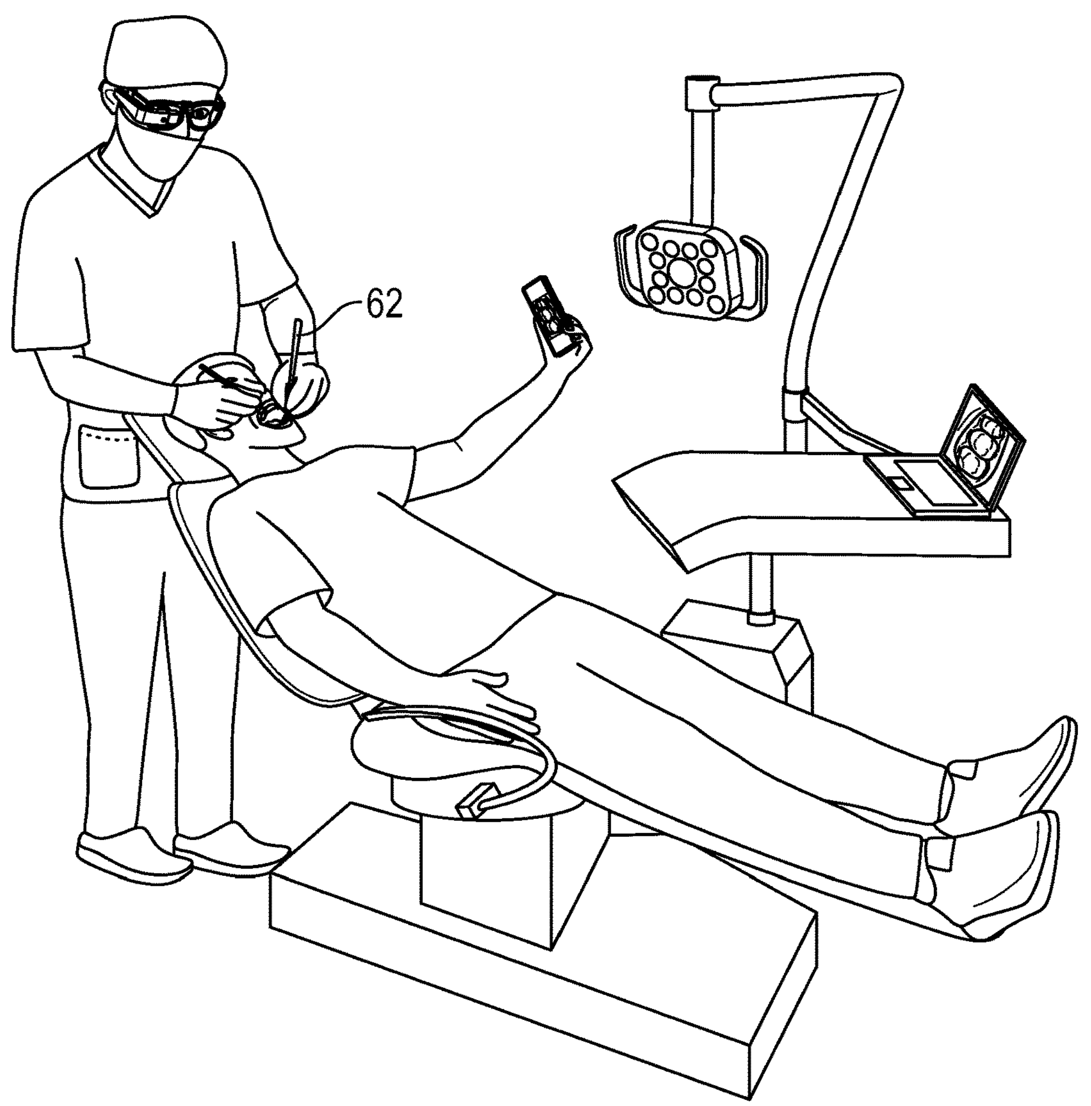
FIG. 4 shows an image being captured by yet another alternative camera being displayed on multiple apparatuses.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

1. Major Components of the System a. Wearable Smartview Apparatus (WSA): The smartview apparatus may be one of a number of head supported devices such as glasses or headbands for example. As shown in FIG. 1, the apparatus 12 may include a frame 14, a microphone 16, at least one high resolution camera assembly 18, and an LCD display module 20 providing a hands-free and real-time visual aid to medical and/or dental professionals. Optionally a charging device 22 connected to the LCD display via a wire 24 may also be employed. The frame 14 may be in the form of an adjustable headband or glasses, for example. Further, the frame may be rigid or flexible. When in the form of "glasses," the frame 14 generally includes first and second legs 32 and 34, respectively, and face portion 36 including first and second eyelets 38 and 40. The eyelets may host protective transparent lenses which can be either prescription or non-prescription in nature. The microphone 16 is capable of receiving voice commands from the WSA operator whereby the voice commands can control either the image being displayed on the LCD display or the image being transmitted to a secondary display device or both. As shown, under one embodiment the microphone 16 may be integrated into the frame or may be an add-on component. The voice commands may also control the functionality of the camera assembly 18 to capture a specific image such as a close up of the area of interest by the user, e.g. a surgical side or an intra-oral area, for example. The camera assembly 18 generally includes a base 42 coupled to the frame and a high resolution camera 44 which may be a commercially available device provided it is capable of high resolution imagery with zoom functionality. Preferably the camera assembly 18 will have at least 10× magnification for example. As should be understood, the camera assembly can be permanently affixed to the frame or can be selectively removable, e.g. attachable via mechanical or magnetic coupling. Under one embodiment the camera can be rotated manually or automatically via voice command to obtain the desired imagery. As should be appreciated, base 42 may include the necessary microelectronics to drive the operation and/or functionality of the camera.

Figure 5:
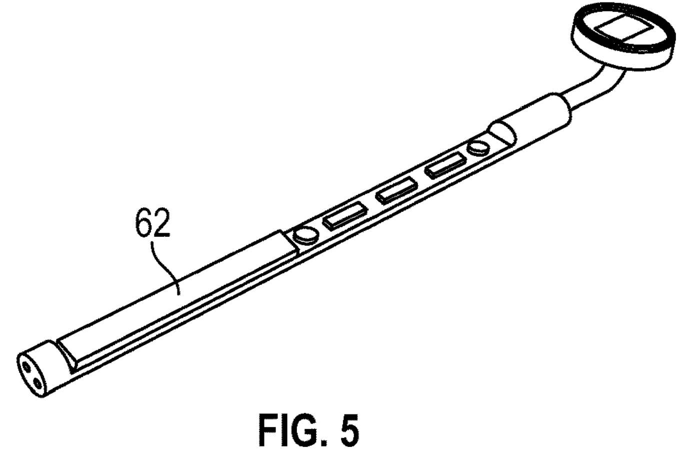
FIG. 5 shows an example of a hand held smart view device used in conjunction with the wearable smartview apparatus of FIG. 1.

The LCD display module 20 includes a housing 46 having a first section 48 which may be disposed substantially parallel to frame leg 32 and a second section 50 which during use is disposed within the user's line of sight. Contained within the housing 46 are the microelectronics needed to drive the operation and/or functionality of the LCD screen. The LCD screen 52 is disposed on the inner side 54 of the second section. If coupled to the frame, the LCD display module is preferably movable such as by a pivotable coupling between a viewing position (down) in the field of sight of the user during use to a position out of the field of sight while not in use (up). Further, the display may be in the field of sight of a single eye or both eyes under certain circumstances. By employing in the field of sight of a single eye, the user's other eye is free for other use. Hereto, the LCD module can be permanently coupled to the frame such as along a temple stem when in the form of glasses or affixed via mechanical or magnetic coupling, for example. The battery pack 22 is preferably rechargeable and may be permanently affixed to the frame or may be coupled thereto by mechanical or magnetic coupling, for example.

b. Computer System: The computer system may be part of an on-site workstation or located remotely if linked via Wi-Fi or Bluetooth connectivity, for example. Ideally the computer will allow access to any one of a number of databases such as patient records, treatment plans, and diagnostic software, for example. The computer system should support the use of any one of a number of software applications including but not limited to a dedicated app designed specifically for use with the WSA. Among the features of the app will be the ability to (1) allow users to choose which smart device(s) can access to the WSA; (2) capturing images to be edited, labeled to be shared and stored in patient charts; (3) use of preloaded illustrations of dental disease images and procedures for patient education. For example: What tooth decay looks like and tooth fillings. Another example can be of an infected tooth illustration and a root canal procedure, etc. During the exam, the clinician can exam and diagnose the patient's teeth, and select the appropriate illustration with its procedure to educate the patient; and (4) users can interface with others with the clinician in real time. Still other uses for an associated app are contemplated.

c. Computer Operating System: The computer operating system (COS) may be a customized platform or based on a known operating system such as Android, iOS, or Windows based platforms by way of non-limiting example. The COS will depend in part on the desired functionality of the database(s) to be accessed and utilized including, for example, the above noted dedicated app.

d. Wireless Communication Module: This is intended to be a known platform such as Wi-Fi, Bluetooth, or satellite system capable of serving as a network communication platform to transmit data between the linked devices of the smartview system.

e. Secondary Display Device (SDD): The smartview system of the present invention may also include one or more secondary display devices which can be in the form of a smartphone, tablet, smart TV, or computer screen by way of non-limiting example. The SDD 60 is capable of displaying the images captured by the camera of the WSA in both real-time and at a later time and date by accessing stored files. Optionally, the SSD can display images captured by an alternative image capturing device 62 such as a hand-held camera or some other type of hand-held dental camera. The intra-oral camera 62 may be any one of a number of known cameras currently available. Further, the camera may be a hand-held Wi-Fi enabled digital camera as described in the provisional application associated herewith and depicted in FIG. 5. Through Wi-Fi or another form of telecommunication, the intra-oral device can capture and project the images to the LCD screen and/or other linked SDD's. Further, under certain embodiments, a device such as a smartphone can be used to capture images which are displayed at both the WSA LCD display as well as other SDD devices. The SDD allows individuals not wearing the WSA to see the images being captured thereby in real-time either in proximity to the individual using the WSA or remotely in the case of real-time consultation, for example. Still other uses of the SDD are contemplated.

2. Functionality of the System a. Imaging: The integrated camera captures images, which can be displayed on the "glass" or the associated LCD screen coupled to the wearable apparatus. Medical or dental professionals can visualize the images without the need for additional screens or devices, increasing efficiency and accuracy. Additionally, images from the camera can also be displayed on one or more SDD's such as a screen associated with the central terminal, a screen positioned on a wall or ceiling of the work space, or a tablet or phone screen. By allowing for simultaneous display, the medical or dental professional can explain the procedure in real-time to the patient while continuing to work on the patient without taking a break to do so.

b. Augmented Reality Elements: Medical and dental professionals can access and utilize virtual overlays that provide guidance during procedures. These elements can include annotations, magnification, and anatomical references, aiding in accurately performing procedures.

3. Benefits of the Wearable Smartview Apparatus (WSA)

a. As should be understood, the Wearable Smartview Apparatus (WSA) of the present invention is useful for both medical and dental purposes. The device and its use will be described below with regard to a dental professional in order to convey a practical application.

As a dental professional the position is to sit 11 o'clock or 12 o'clock to the patient, i.e in a relatively upright position over the patient. Using unassisted vision to work inside a patient's mouth can cause eye fatigue, as well as lower back pain and/or neck pain due to the long hours in this posture. In order to alleviate some or all of the foregoing problems, the WSA offers an improved alternative to "dental loupes" which tend to be relatively heavy. Once the WSA is Wi-Fi linked to a mobile phone, digital tablet, or a touch screen display for example, the operator can magnify the image, capture the image, create a video and store it on an associated device or on the central workstation device. The WSA allows the clinician to view images on an LCD screen associated therewith while he/she is working in the optimal upright position. The captured images can be used to communicate with other dental professionals or can be saved in the patient's chart for later use. All these functions are done at the clinician's fingertips. Because the image is digital and can be enlarged without distortion, the user's eye muscles do not have to constantly readjust which can lead to eye strain and/or headaches.

4. A Theoretical Example Explaining How the System and Apparatus Are Used a. Assuming a patient is in need of a dental procedure such as a cavity filled, once the patient is numbed with a local anesthetic, sitting at the 11 o'clock position, the user places the WSA on their head, turns on the device, and adjusts the LCD viewer coupled to the WSA frame (rotates up/down) into the user's line of sight. The operator looking down at the patient using the digital camera is able to see a high definition image of the patient's oral cavity of the LCD viewer. The operator moves the camera, which has a certain range of rotation to capture the best view possible. Once the best view is obtained, work in the mouth can begin. During the procedure the camera and magnification can be continuously adjusted to magnify the image as needed. For example, once a tooth is cleaned of decay, increase in magnification may be employed to see cracks, remaining decay, margins and etc. before the tooth is restored. At this point, any and all images can be shared with the patient on a secondary display device or can be saved and shared with the patient after the appointment.

b. During a consultation appointment, the WSA can be linked to the patient's mobile phone through a mobile application (app). Now the patient will be linked to the device and be able to see everything the operator is seeing. During this appointment the patient can be educated about their oral health with visual support. Treatment planning and options can be discussed so the patient can see and understand the value of each choice. All images can be captured, edited and saved in the patient's chart for later use or to be emailed directly to an oral surgeon or another dental specialist. Using the WSA in this way can save the expense of having to purchase an intra-oral camera, although supplemental intra-oral cameras may be employed.

c. Advantages of using the WSA device include the ability to detect oral health problems earlier, improve relationships with patients, enhanced accuracy for treatments, more reliable and accessible dental records, and allows for an easier insurance claim process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A digital dental loupe system comprising:

a lightweight, ergonomically contoured head-mounted frame constructed from carbon fiber reinforced polymer (CFRP) with integrated medical-grade PEEK housing inserts and thermoplastic polyurethane (TPU) contact points;

a central optical assembly mounted at a user's visual axis, said assembly comprising:

magnification optics with adjustable zoom ranging from 2× to 10×;

a high-definition autofocus camera integrated within the central optical module capable of capturing intraoral images and video;

an integrated voice-controlled interface configured to activate system functions via user commands;

a lighting system including both white LED illumination and ultraviolet light-emitting elements configured to induce fluorescence in dental tissues and restorative materials;

wherein the lighting system enhances visualization of dental decay and restorative materials;

the system further provides real-time tracking and positioning of dental tools within augmented reality overlays;

wherein augmented reality overlays include patient-specific dental data and provides real-time procedural guidance; and a wireless communication module configured for real-time image streaming, remote consultation, and cloud-based data access.

2. The smart glasses system according to claim 1, further comprising a wireless communication module configured to establish communication with connected dental equipment.

3. The smart glasses system according to claim 1, further comprising sensors configured to detect head movement and gestures for hands-free system control.

4. The smart glasses system according to claim 1, wherein augmented reality overlays include patient-specific dental data including X-ray images, dental records, treatment plans, or patient vitals.

5. The smart glasses system according to claim 1, wherein augmented reality overlays provide real-time procedural guidance including tooth identification, cavity detection, or proximity alerts.

6. A method for providing augmented reality assistance during dental procedures using the smart glasses system of claim 1.

7. The method of claim 6 further comprising tracking the position and movement of dental tools within the augmented reality overlays.

8. The system of claim 1 wherein the voice-controlled interface includes natural language recognition configured to toggle between diagnostic modes.

9. The system of claim 1 wherein the display module comprises dual non-transparent visor-mounted microdisplays.

10. The system of claim 9 wherein each visor is rotatable up to approximately 120 degrees relative to the head-mounted frame.

11. The system of claim 1 wherein the camera includes autofocus and low-light optimization algorithms for intraoral imaging.

12. The system of claim 1 wherein illumination elements are arranged circumferentially around the central optical assembly.

13. The system of claim 1 wherein captured intraoral images are transmitted wirelessly to external computing systems for storage or remote consultation.

* * * * *